United States Patent
Frank et al.

(10) Patent No.: US 8,082,092 B2
(45) Date of Patent: Dec. 20, 2011

(54) PROCESS FOR CONTROLLING AN INTERNAL COMBUSTION ENGINE

(75) Inventors: Holger Frank, Friedrichshafen (DE);
Marc Hehle, Constance (DE); Michael Willmann, Bermatingen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 749 days.

(21) Appl. No.: 12/284,385

(22) Filed: Sep. 22, 2008

(65) Prior Publication Data

US 2009/0082944 A1 Mar. 26, 2009

(30) Foreign Application Priority Data

Sep. 21, 2007 (DE) .................. 10 2007 045 194

(51) Int. Cl.
*B60T 7/12* (2006.01)
*G05D 1/00* (2006.01)
*G06F 7/00* (2006.01)
*G06F 17/00* (2006.01)
*F01L 9/04* (2006.01)

(52) U.S. Cl. ..................... 701/103; 123/90.11

(58) Field of Classification Search .............. 701/101, 701/102, 103, 110, 114, 115; 123/90.11, 123/90.15, 90.16, 90.45, 90.48, 479, 568.16; 73/114.31, 114.45, 114.74, 114.79; 702/34, 702/113, 115, 182, 184; 251/129.09, 129.1

See application file for complete search history.

(56) References Cited

U.S. PATENT DOCUMENTS

| 6,289,858 | B1 * | 9/2001 | Altdorf et al. | 123/90.11 |
|---|---|---|---|---|
| 6,439,197 | B1 | 8/2002 | Green et al. | |
| 6,554,248 | B2 * | 4/2003 | Taniguchi et al. | 251/129.04 |
| 6,637,697 | B1 | 10/2003 | Wienberg | |
| 6,805,079 | B1 * | 10/2004 | Brehob et al. | 123/90.11 |
| 6,953,014 | B2 * | 10/2005 | Folino | 123/90.24 |
| 2003/0089324 | A1 * | 5/2003 | Duesmann | 123/90.48 |
| 2004/0139949 | A1 * | 7/2004 | Koseki et al. | 123/568.14 |
| 2006/0169229 | A1 * | 8/2006 | Ervin et al. | 123/90.11 |
| 2006/0169230 | A1 * | 8/2006 | Ervin et al. | 123/90.11 |
| 2009/0241872 | A1 * | 10/2009 | Wang et al. | 123/90.11 |

FOREIGN PATENT DOCUMENTS

| DE | 19652719 | 6/1998 |
|---|---|---|
| DE | 19830667 | 1/2000 |
| DE | 69917024 | 11/2004 |
| GB | 2320522 | 6/1998 |
| WO | WO 2005/064281 | 7/2005 |

* cited by examiner

*Primary Examiner* — Willis Wolfe, Jr.
*Assistant Examiner* — Anthony L Bacon
(74) *Attorney, Agent, or Firm* — Lucas & Mercanti, LLP; Klaus P. Stoffel

(57) ABSTRACT

A process for controlling an internal combustion engine, in which an actual position of a reciprocating gas valve is detected by a position sensor, a positional deviation is calculated from the actual position and a zero position, a total length change of the reciprocating gas valve is calculated as a function of the temperature of the reciprocating gas valve, a valve clearance of the reciprocating gas valve is determined from the positional deviation and the total length change, and the further operation of the internal combustion engine is determined on the basis of the valve clearance.

9 Claims, 4 Drawing Sheets

PROCESS FOR CONTROLLING AN INTERNAL COMBUSTION ENGINE

BACKGROUND OF THE INVENTION

The invention relates to a process for controlling an internal combustion engine.

In practice, large diesel engines are delivered without automatic valve clearance compensation. After a fixed, predetermined period of operation, therefore, the valve clearance must be adjusted by a service mechanic according to a maintenance plan. The maintenance plan lists the boundary conditions such as an engine cooling water temperature of less than 40° C. and each of the individual steps. First, an engine-cranking device is attached; the cylinder head covers are removed; and the cranking device is used to close the reciprocating gas valves one after the other. In the closed state, a feeler gauge is then used to check the actual valve clearance of each valve. If this deviates from the nominal valve clearance, the service mechanic must adjust the actual valve clearance with an adjusting screw until the actual value clearance agrees with the nominal valve clearance. In the case of a large diesel engine with sixteen valves, for example, this is a time-consuming and cost-intensive procedure and, if the engine is installed in a ship, it leads to correspondingly high harbor docking fees.

A measure for improving this situation consists in measuring the actual position of the reciprocating gas valve inductively or capacitively (DE 198 30 667 A1) by way of a normally open contact (DE 196 52 719 A1) and to use this as a basis for the further control of the internal combustion engine, such as a variable valve control. It is known from WO 2005/064281 A1 that the actual position of a component capable of linear movement can be measured by magnetic coding, that this position can be compared with a calibrated zero position, and that a positional deviation can be determined from that. The critical point in these devices and methods is that, although the temperature-caused change in length of the reciprocating gas valve is in fact detected as a positional deviation, it cannot be interpreted as allowable or not allowable in the sense of wear. A clear conclusion with respect to operational reliability therefore cannot be reached.

SUMMARY OF THE INVENTION

The invention is based on the object of providing a process with improved operational reliability.

Pursuant to this object, one aspect of the present invention resides in a process in which an actual position of a reciprocating gas valve is detected by a position sensor; a positional deviation is calculated from the actual position and a zero position; and a total length change of the reciprocating gas valve is calculated as a function of the temperature of the reciprocating gas valve. Then the valve clearance of the reciprocating gas valve is determined from the positional deviation and the total length change, and the further operation of the internal combustion engine is established on the basis of the valve clearance. If the valve clearance is not allowable, a diagnostic entry is made, and a follow-up adjustment, in particular a power reduction of the internal combustion engine, is initiated.

The total length change of the reciprocating gas valve is calculated from the sum of the individual length changes. An individual length change for a geometric location of the reciprocating gas valve is calculated in turn from a coefficient of linear expansion of a starting length at a reference temperature and from a temperature difference. The temperature difference is determined from the difference between a calculated temperature and the reference temperature, where the calculated temperature is determined as a function of the geometric location by the use of a characteristic curve. The geometric location is defined on the basis of the distance from the bottom surface of the valve plate. The bottom surface of the valve plate is the side which closes off the combustion chamber in the direction toward the gas intake port or the gas exhaust port. It is advantageous that the cause of the valve clearance can be clearly identified, i.e., as being caused by either wear or temperature.

For example, increasing the power output of the internal combustion engine causes the temperature at the reciprocating gas valve to increase, which has the effect of decreasing the valve clearance, which can be allowable for this particular operating point. In this way it is also possible to tell with certainty how far the valve seat has worn down.

The characteristic curve can be selected from a family of characteristics on the basis of a measured reference temperature, or it can be calculated from a basic curve on the basis of the measured reference temperature. The reference temperature is measured in the area of the reciprocating gas valve, possibly in its guide sleeve, for example, by a temperature sensor. Alternatively, it is possible to calculate the characteristic curve by the use of a model on the basis of parameters which determine the combustion process. The model can be adapted additionally on the basis of a comparison between the model-based characteristic curve and the measured reference temperature.

A key advantage of the process is that the maintenance of large diesel engines can be carried out on the basis of their actual condition. As a result of the elimination of the mechanical readjustments of valve clearance by the service mechanic, maintenance costs for the end user are significantly reduced. The model-based solution also offers the advantage that the process can be offered as a pure software solution in an upgrade package.

Other features and advantages of the present invention will become apparent from the following description of the invention.

DETAILED DESCRIPTION OF THE INVENTION

Figure 1:
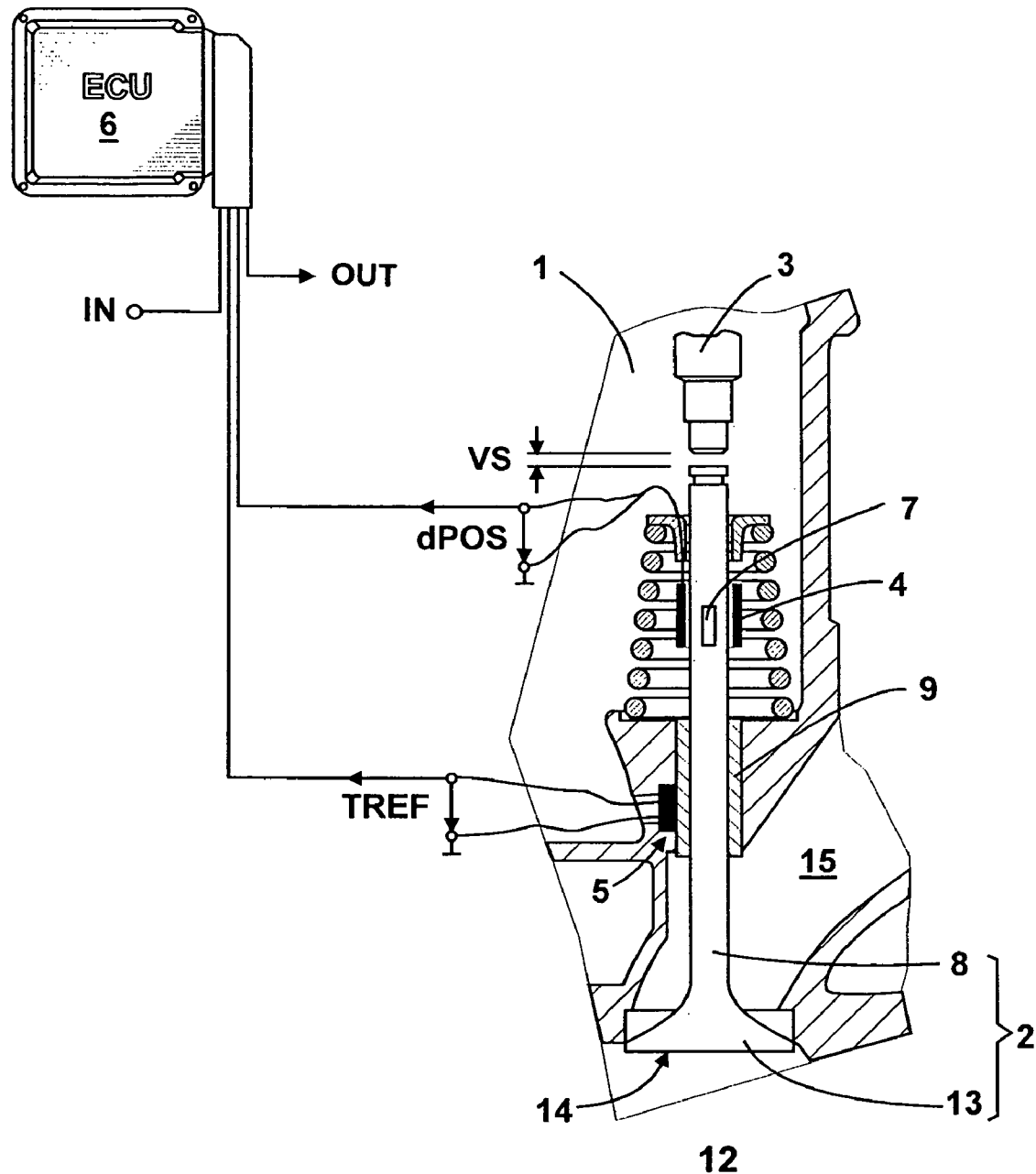
FIG. 1 shows a diagram of a system with a temperature sensor.

FIG. 1 shows a diagram of the system with a temperature sensor for measuring a reference temperature TREF. The individual components are: a cylinder head 1 with a reciprocating gas valve 2, such an intake valve; a rocker 3 for actuating the reciprocating gas valve 2; a position sensor 4; the temperature sensor 5; and an electronic control unit (ECU) (6). The reference symbol VS characterizes the valve clearance between the rocker 3 and the reciprocating gas valve 2. The position sensor 4 detects the actual position of the reciprocating gas valve 2 by means of an inductive or capacitive pickup, for example, or an opto-electronic device or a magnetically coded area 7 on the valve shaft 8. In the electronic control unit 6, a positional deviation is then calculated from the actual position and a zero position. It is assumed in the following discussion that the position sensor 4 comprises an integrated evaluation unit, which provides the positional deviation dPOS between the actual position and the calibrated zero position as its output signal. References in the text to the positional deviation dPOS are therefore to be understood in the sense that the positional deviation dPOS is provided by the position sensor 4 or is calculated by the electronic control unit 6. The reference temperature TREF is measured by the temperature sensor 5 in the area of the reciprocating gas valve 2, such as on the guide sleeve 9. On the basis of the known properties of the material, there is a corresponding correlation with the temperature of the reciprocating gas valve 2. The position of the reciprocating gas valve 2 or the positional deviation dPOS and the reference temperature TREF are input variables for the electronic control unit 6.

The electronic control unit 6 determines the operating mode of the internal combustion engine. This unit contains the conventional components of a microcomputer system such as a microprocessor, I/O components, buffers, and memory components (EEPROM, RAM). Operating data in the form of families of characteristics relevant to the operation of the internal combustion engine are stored in the memory components. Using these data, the electronic control unit 6 calculates the output variables from the input variables. In FIG. 1, the other input variables are summarized by the reference symbol IN. The additional input variables IN include, for example, a rail pressure, engine rpms, a power requirement, the air charge pressure of a turbocharger, the temperature of the charge air, the exhaust gas temperature, and the temperatures of the coolants/lubricants and of the fuel. The output variables of the electronic control unit 6 are summarized by the reference symbol OUT. This stands for the other actuating signals used for the open-loop and closed-loop control of the internal combustion engine such as the beginning and ending times of injector actuation and a signal for actuating a suction throttle in a common rail system.

The process operates as follows:

After the electronic control unit 6 has received the positional deviation dPOS and the reference temperature TREF, a characteristic curve (FIG. 2) is selected as a function of the reference temperature TREF. For a geometric location of the reciprocating gas valve, a temperature for this geometric location is calculated on the basis of the characteristic curve. As understood in the invention, "geometric location" refers to a disk of the reciprocating gas valve of finite thickness, for example, a disk with a thickness of 1 mm. The geometric location is defined on the basis of the distance of this disk from the bottom surface of the valve plate. The bottom surface 14 of the valve plate 13 is the surface which closes off the combustion chamber 12 in the direction toward the gas intake port 15 or gas exhaust port. On the basis of the calculated temperature and the coefficient of linear expansion, an individual length change for this geometric location is then calculated according to the following equation:

$$dL(i) = \text{Alpha} \cdot dT(i) \cdot L0(i)$$

with $$dT(i) = T(i) - T0,$$

where:

dL(i) the individual length change of the reciprocating gas valve at geometric location i Alpha the coefficient of linear expansion (constant)

dT(i) the change in temperature versus the reference temperature

L0(i) the starting length of element i at the reference temperature

T(i) the calculated temperature at location i

T0 the reference temperature i the sequential variable corresponding to an element with a value of 1, 2 . . . .

Next, the characteristic curve is used iteratively for additional geometric locations of the reciprocating gas valve 2 to determine the other temperatures, and the additional individual length changes are calculated according to the valves of the assigned variables as explained above. Then the individual length changes are added up to obtain the total length change, which serves as a measure of the temperature-caused change in the length of the reciprocating gas valve. On the basis of the positional deviation dPOS and the total length change, the valve clearance VS is determined and evaluated, and the further operation of the internal combustion engine is established.

Figure 2:
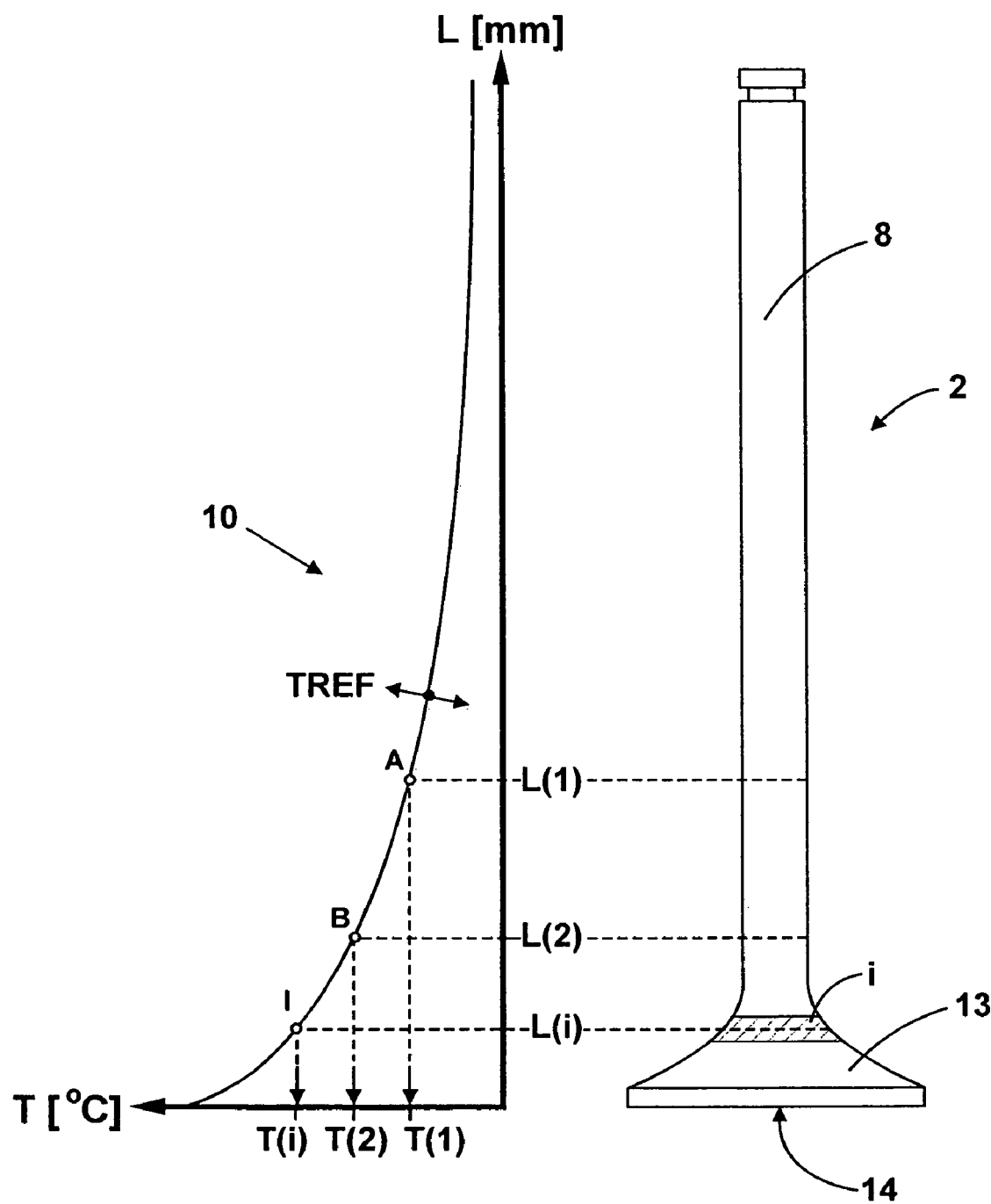
FIG. 2 shows a characteristic curve.

FIG. 2 shows the reciprocating gas valve 2 and the characteristic curve 10 used to calculate a temperature. The characteristic curve 10 is selected from the family of characteristics as a function of the reference temperature TREF, as shown by the variable TREF. Of course, the characteristic curve 10 can also be calculated from a basic characteristic curve and the reference temperature TREF. The length L of the reciprocating gas valve 2 is shown on the ordinate, and a temperature T is plotted on the abscissa. A geometric location L(1) is situated on the valve shaft 8. "Geometric location" in the sense of the invention is a disk of the reciprocating gas valve of finite thickness such as a disk with a thickness of 1 mm. The reference symbol i designates a disk of this type by way of example. The geometric location L(1) is defined by its distance from the bottom surface 14 of the valve plate 13. The bottom surface 14 of the valve plate 13 is the side which closes off the combustion chamber in the direction toward the gas intake port or the gas exhaust port. The origin of the coordinates of the characteristic curve 10 represents the bottom surface 14 of the reciprocating gas valve 2. For the geometric location L(1) on the valve shaft 8 of the reciprocating gas valve 2, a temperature T(1) is calculated by the use of point A on the characteristic curve 10. On the basis of the temperature T(1), an individual length change dL(1) is calculated by the use of the valves of the assigned variables as explained above. For a geometric location L(2), a temperature T(2) is calculated by the use of point B on the characteristic curve 10, and from that an individual length change dL(2) is obtained. For a geometric location L(i), a temperature T(i) is calculated by the use of point i on the characteristic curve 10, and from that an individual length change dL(i) is obtained. This iterative process is used to find all of the individual length changes, which are then added to obtain the total change in the length of the reciprocating gas valve 2.

Figure 3:
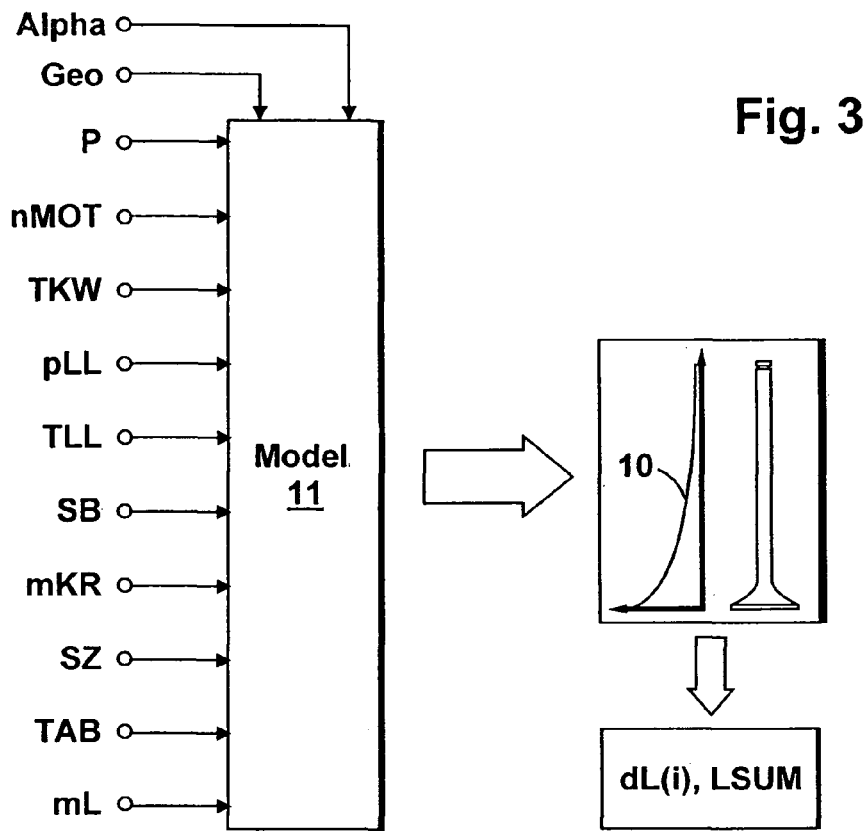
FIG. 3 shows a block diagram.

FIG. 3 shows a block diagram of a model-based solution for calculating the characteristic curve 10. The input variables of the model 11 are preferably the parameters which determine the combustion process: the power P of the internal combustion engine, the engine speed nMOT, the temperature of the cooling water TKW, the pressure pLL and the temperature TLL of the charge air, the injection starting time SB, the weight of the fuel mKR, the control times SZ, the exhaust gas temperature TAB, and the weight of the air mL. As constants, the geometry of the reciprocating gas valve, reference symbol Geo, and the coefficient of linear expansion Alpha of the material of the reciprocating gas valve also enter into the calculation. In the case of a divided reciprocating gas valve, that is, a valve with zones of different materials in the shaft, different linear coefficients of expansion such as Alpha1 and Alpha2 are used. The calculation of the characteristic curve 10 on the basis of the model 11 from the input variables can be conducted on the basis of fuzzy logic, for example, or by the use of a Bayesian network.

The characteristic curve 10 calculated with the circuit diagram of FIG. 3 can be used as an individual solution. In this case, the individual length change dL(i) and the total length change LSUM can be calculated on the basis of the model-based characteristic curve 10. This solution will always be chosen when no reference temperature measurement sites are present near the reciprocating gas valve. If a reference temperature measurement site is present, the model-based characteristic curve can be adjusted on the basis of the reference temperature measurement site.

Figure 4:
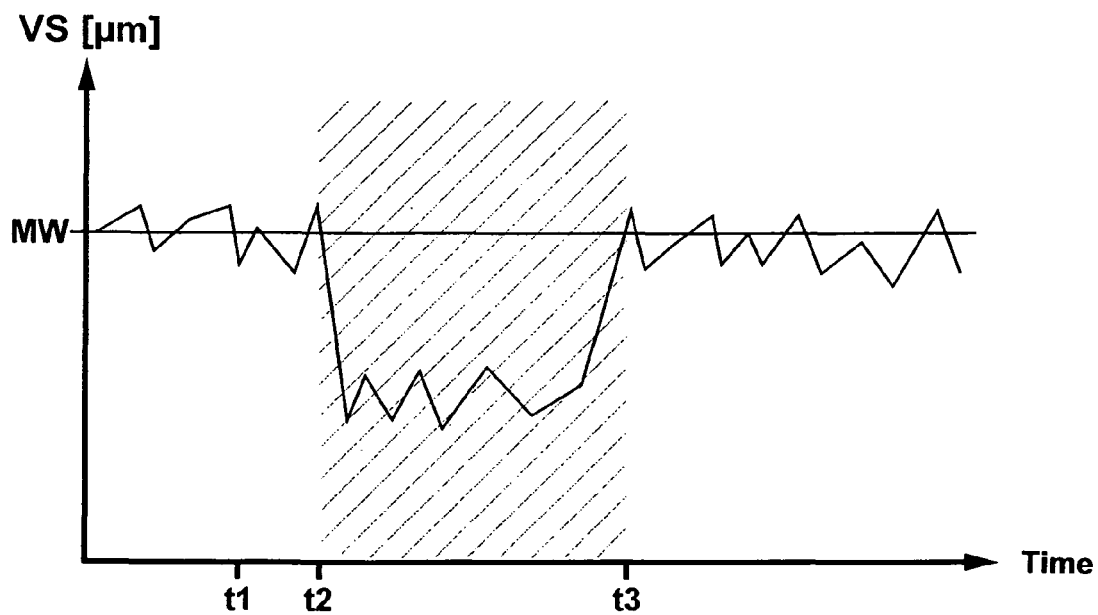
FIG. 4 shows a timing diagram.

FIG. 4 shows a timing diagram of the effect of temperature on the measured valve clearance VS. At time t1, the internal combustion engine is operating in a steady state. During steady-state operation, the valve clearance VS oscillates only insignificantly around a mean value MW. At time t2, the boundary conditions described above change, as a result of which the valve clearance VS decreases considerably. In the shaded time period t2/t3, the valve clearance oscillates on a lower level. Thanks to the inventive process, this smaller valve clearance is clearly identified as being caused by temperature. In this case, no further action is taken. From time t3 on, it is assumed that the temperature of the reciprocating gas valve decreases and that the valve clearance will oscillate again around the original mean value MW.

Figure 5:
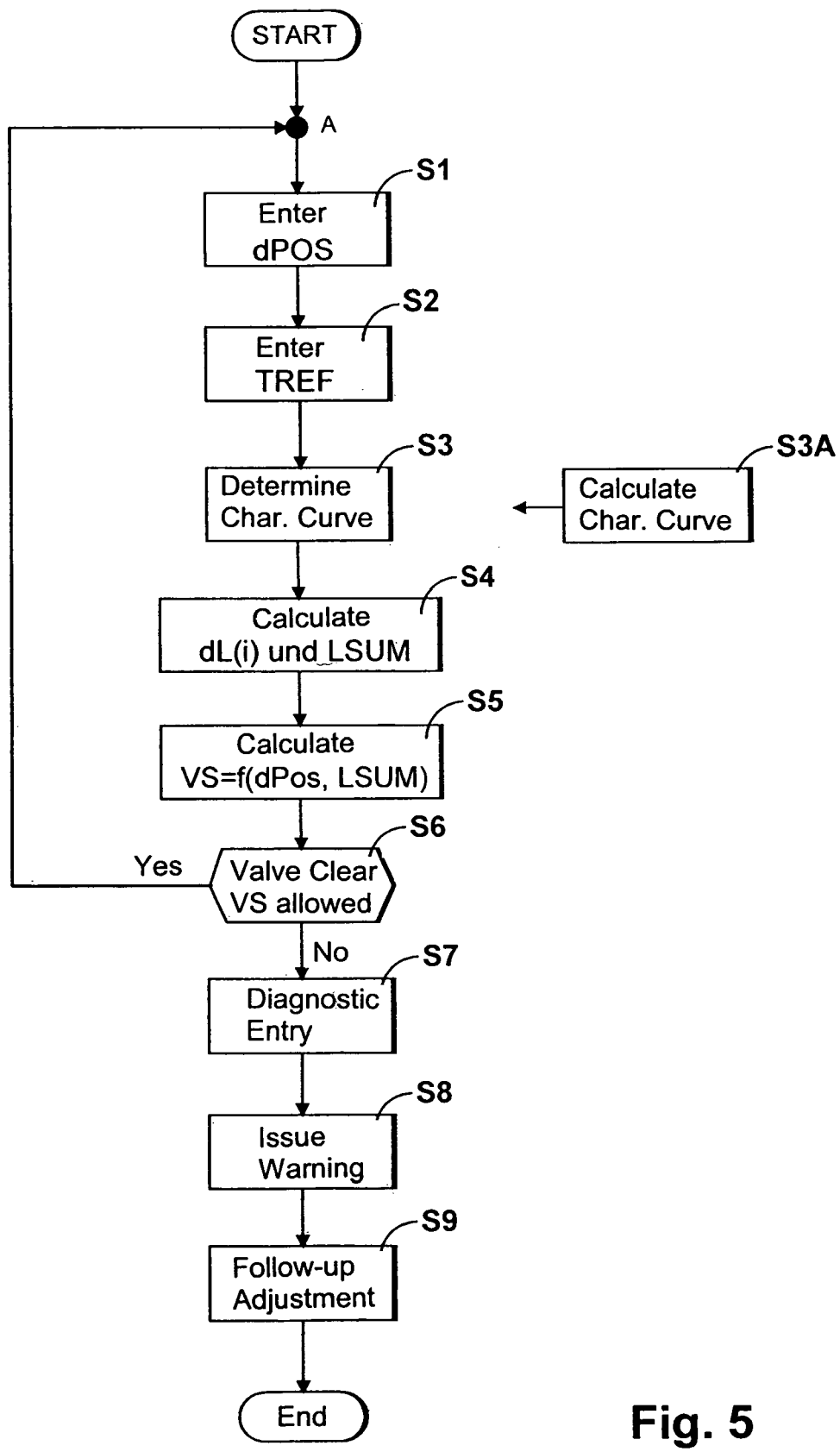
FIG. 5 shows a program flow chart.

FIG. 5 shows a condensed program flow chart of the process as part of an executable program. At S1, the positional deviation dPOS calculated by way of the position sensor from the actual position versus a zero position is entered. Then, at S2, the reference temperature TREF is entered. A characteristic curve (FIG. 2: reference symbol 10) is determined at S3 on the basis of the reference temperature TREF. This is done either by taking an applicable characteristic curve from a family of characteristics as a function of the reference temperature TREF or by calculating the desired curve from a basic curve. If the characteristic curve is calculated by the use of a model, step S3 is replaced by step S3A. Then, at S4, the individual length changes dL(i) are calculated by means of an iterative loop, and the total length change LSUM is obtained by adding up the individual length changes dL(i). An individual length change i is calculated on the basis of the previously described assignments for a geometric location of the reciprocating gas valve on the basis of a characteristic curve. On the basis of the positional deviation dPOS and the total length change LSUM, the valve clearance VS is then determined at S5. At S6, this clearance is checked to see if it is allowed. If the valve clearance VS is in the allowed range (result at S6: yes), then the program continues from point A and step S1. If the valve clearance VS is not allowed (result at S6: no), then at S7 a diagnostic entry is made; at S8 a warning is issued to the operator; and at S9 a follow-up adjustment is initiated. The follow-up adjustment can constitute, for example, a limitation on the power output of the internal combustion engine. Thus the program ends.

In summary, the invention offers the following advantages:

the valve drive is monitored for valve seat wear in real time (on-line);

maintenance costs are reduced because maintenance measures are performed only as needed;

maintenance costs are reduced because there is no longer any need to use a feeler gauge to monitor valve clearance mechanically;

the model-based embodiment can be offered as a software upgrade solution; and the output can serve as an input variable for other automatic control systems such as a variable valve drive.

The invention claimed is:

1. A process for controlling an internal combustion engine, comprising the steps of:
   detecting actual position of a reciprocating gas valve using a position sensor;
   calculating a positional deviation (dPOS) from the actual position and a zero position;
   calculating a total length change (LSUM) of the reciprocating gas valve as a function of the temperature of the reciprocating gas valve;
   determining a valve clearance (VS) of the reciprocating gas valve (2) from the positional deviation (dPOS) and the total length change (LSUM); and
   determining further operation of the internal combustion engine based on the valve clearance (VS).

2. A process according to claim 1, further including making a diagnostic entry and initiating a follow-up adjustment if the valve clearance (VS) is not allowed.

3. A process according to claim 2, wherein the follow-up adjustment is a reduction of the power output of the internal combustion engine.

4. A process according to claim 1, including calculating the total length change (LSUM) of the reciprocating gas valve from a sum of the individual length changes (dL(i), i=1, 2 . . . ).

5. A process according to claim 3, including calculating an individual length change (dL(i)) for a geometric location (L(i)) of the reciprocating gas valve as a function of a coefficient of linear expansion (Alpha), a starting length (L0(i)) at a reference temperature (T0), and a temperature difference (dT(i)), where the temperature difference (dT(i)) is determined from a difference between a calculated temperature (T(i)) and the reference temperature (T0), and the calculated temperature (T(i)) is determined as a function of the geometric location (L(i)) by using a characteristic curve.

6. A process according to claim 5, wherein the characteristic curve is selected from a family of curves on the basis of a measured reference temperature (TREF).

7. A process according to claim 5, wherein the characteristic curve is calculated by the use of a model on the basis of combustion-determining parameters.

8. A process according to claim 7, wherein the characteristic curve is calculated from a basic curve on the basis of the measured reference temperature (TREF).

9. A process according to claim 7, wherein the characteristic curve calculated by the use of the model is adapted by using of the reference temperature (TREF).

* * * * *